Figure 1:
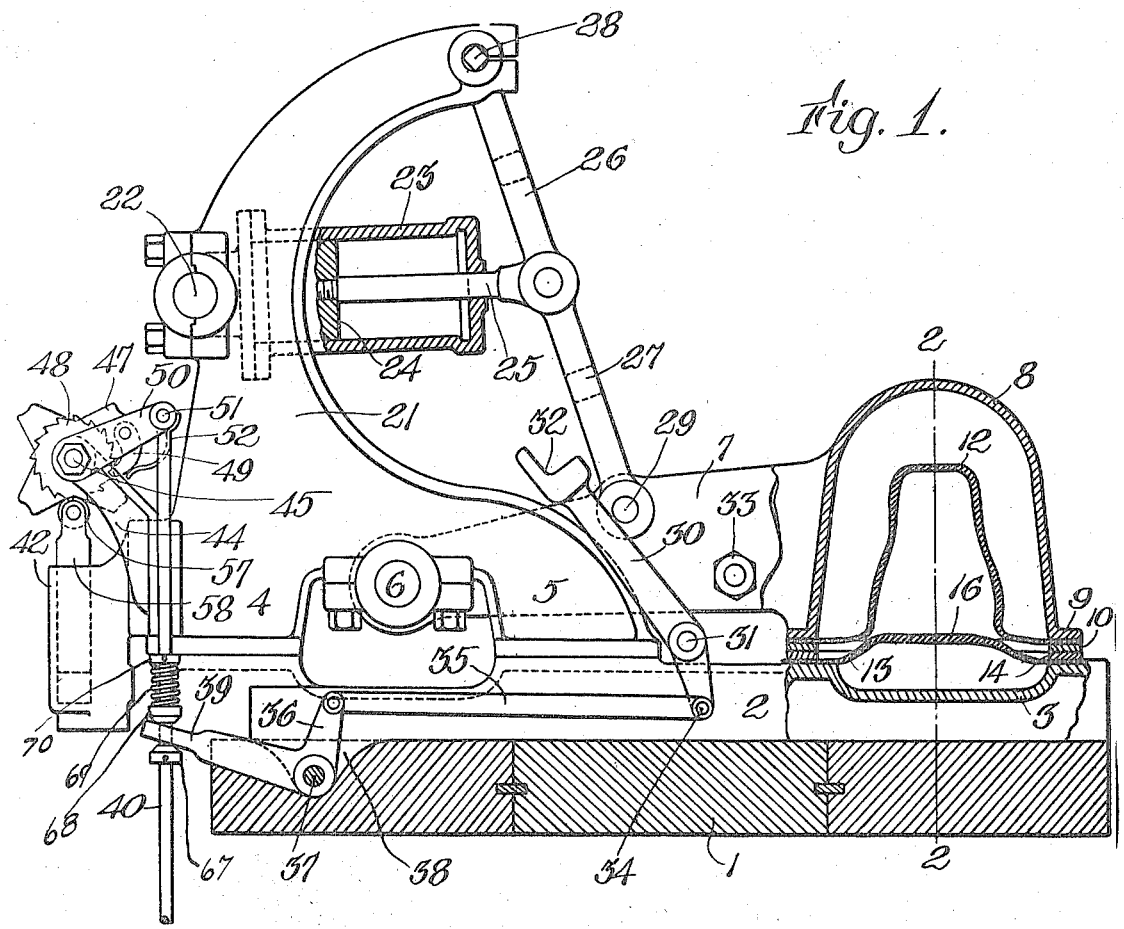

J. W. MOORE.
APPARATUS FOR THE MANUFACTURE OF RUBBER FOOTWEAR.
APPLICATION FILED MAR. 19, 1913.

1,181,083.

Patented Apr. 25, 1916.
2 SHEETS—SHEET 1.

Witnesses:
Edward Maxwell
James R. Holder

Inventor:
Joseph W. Moore,
by Geo. W. Maxwell,
Attorney.

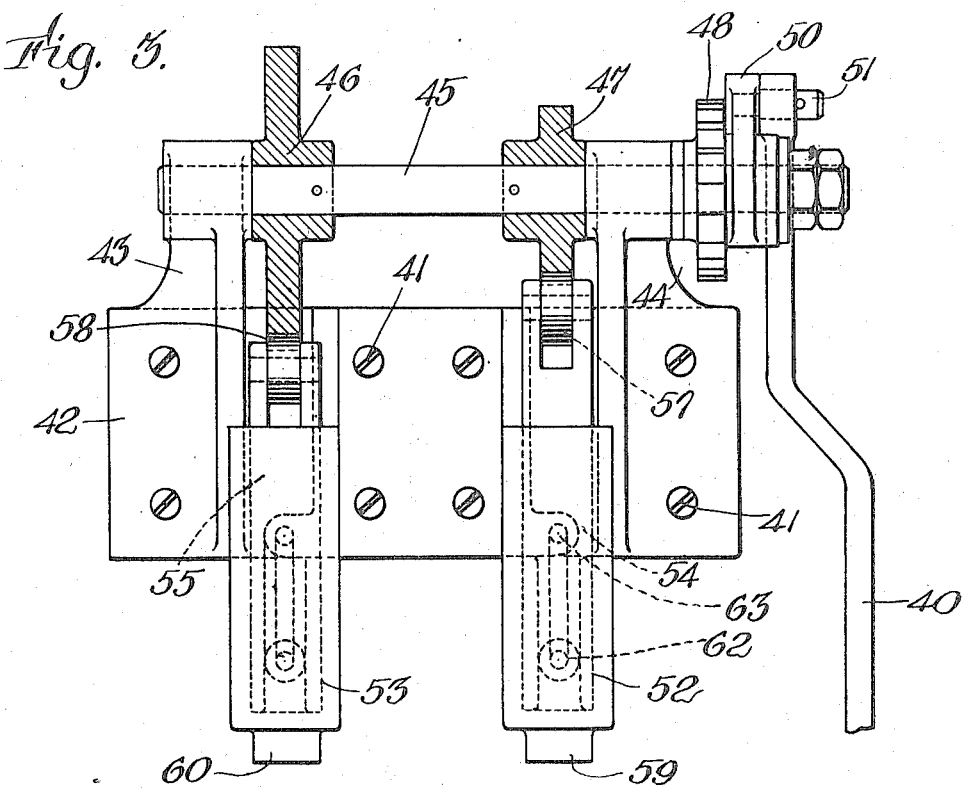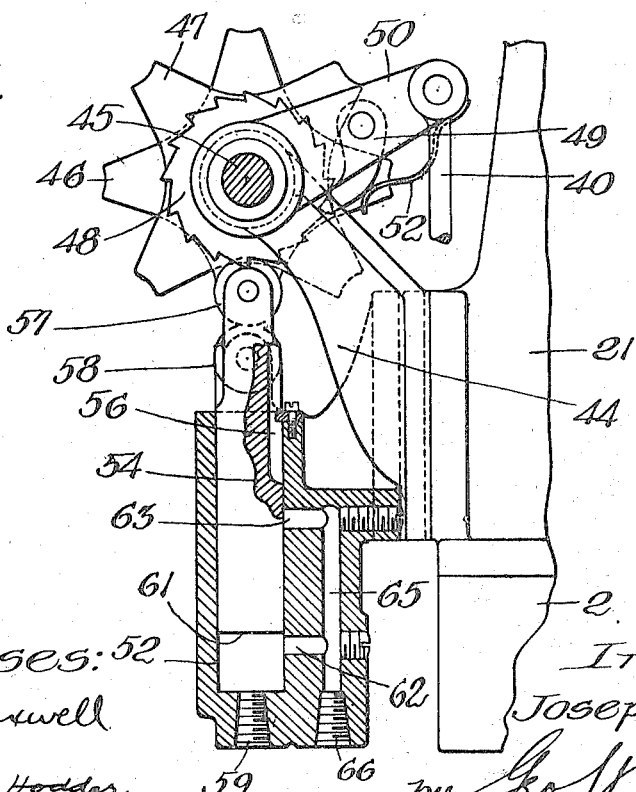

UNITED STATES PATENT OFFICE.

JOSEPH W. MOORE, OF NEWTON HIGHLANDS, MASSACHUSETTS, ASSIGNOR TO BOSTON RUBBER SHOE COMPANY, A CORPORATION OF MASSACHUSETTS.

APPARATUS FOR THE MANUFACTURE OF RUBBER FOOTWEAR.

1,181,083.  Specification of Letters Patent.  Patented Apr. 25, 1916.

Application filed March 19, 1913. Serial No. 755,414.

*To all whom it may concern:*

Be it known that I, JOSEPH W. MOORE, a citizen of the United States, and resident of Newton Highlands, county of Middlesex, State of Massachusetts, have invented an Improvement in Apparatus for the Manufacture of Rubber Footwear, of which the following description, in connection with the accompanying drawings, is a specification, like letters on the drawings representing like parts.

This invention relates to the manufacture of rubber footwear, and more particularly to providing an apparatus which will prepare such footwear for the vulcanizing process.

In the manufacture of rubber shoes, overshoes, and the like, it is necessary to assemble the insole, lining, counter, piping, upper materials, and outsole upon a last, and it has heretofore been customary to have each article fitted to the last and then rolled by hand. Such hand rolling operation serves to conform the various parts and layers comprising the rubber shoe to the last on which they are assembled, and also to press the various layers into a substantially compact form and a homogeneous article.

This hand work required considerable skill and strength on the part of the operator and it is an object of my present invention to provide an automatic apparatus which will entirely eliminate these hand rolling operations. Furthermore, my apparatus effects a much better product, as I provide means to apply pressure to any desired amount simultaneously on all the layers constituting the rubber shoe and to apply said pressure evenly and uniformly throughout the entire surface of the shoe materials. This is of decided importance, as it will be understood that in hand rolling it was often difficult to cover the entire surface of the layer being subjected to the rolling operation, the hand rolls used being small steel cylinders with a straight surface and the last on which they were used was of course provided with a curved contour of varying form. A further objection to the hand rolling operation has been that such hand rolling tended to displace the upper layers and cause them to "creep," whereas by means of my apparatus all such difficulty is eliminated, my invention contemplating means to apply pressure simultaneously and directly upon the entire surface of a layer and to hold the same exactly where it was assembled on the last. It will be readily understood that the applications of pressure upon the materials comprising the upper and sole portions of a rubber shoe are very necessary to combine the various layers into a firm form preparatory to the subsequent vulcanizing process, and that such pressure is also important in providing a smooth product to exactly conform to the last on which the shoe is being made. A further important feature of my invention is that I am enabled to provide an apparatus which will automatically apply pressure to a large number of different sizes, styles and forms of shoes without change in the apparatus or any of the mechanisms or operations thereof, and thus such different sizes and forms may be operated on successively and at random with equally satisfactory results.

In my present apparatus as herein illustrated, I employ a yielding or flexible diaphragm, or plurality of such diaphragms, to conform automatically about the shoe materials while contained on a last and provide means to supply pressure to the outer side of said diaphragm or diaphragms by pneumatic means. Any fluid means of applying pressure would be suitable, either hydraulic or a combination of hydraulic and pneumatic means.

Other features of the invention, novel combinations of parts, and details of construction will be hereinafter more distinctly pointed out and claimed.

Figure 2:
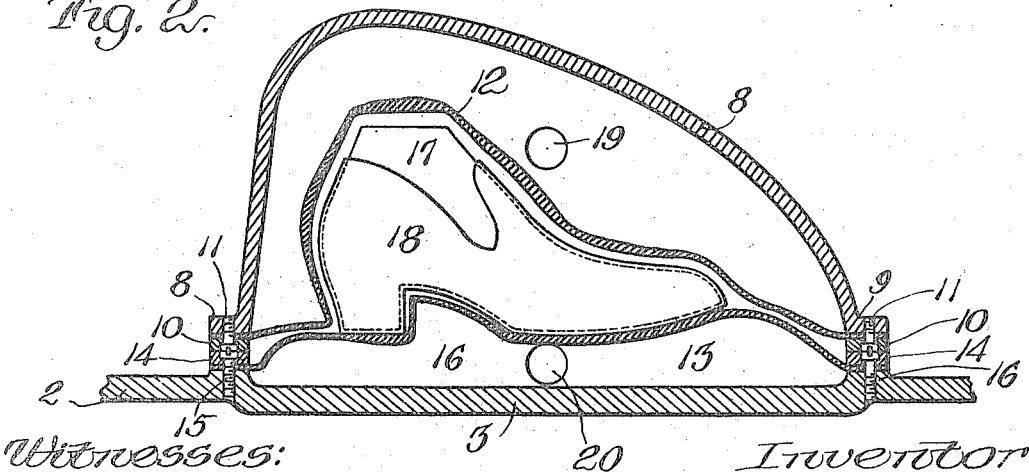

Referring to the drawings, illustrating a preferred embodiment of my invention, Figure 1 is a side view partly in section of my apparatus; Fig. 2 is an enlarged view on the line 2—2 of Fig. 1; and Figs. 3 and 4 are detail views of the valve mechanism, controlling the pressure supply.

Mounted upon a suitable support or table 1 is a bed plate 2, preferably of metal, and having a depression or recess 3 formed near one end, of suitable area in length and breadth to contain the largest sized last and rubber shoe which the apparatus is to operate upon. A journal bearing mounted upon legs 4 and 5 carries a pivot shaft 6, on which the member 7 is arranged to be supported at one end, having the other end provided with a dome 8 in proper position and of corresponding form to the recess 3, so as to register therewith and cover the same when the upper member 7 is in lowered position, as shown in Fig. 1. The dome 8 is formed with an edge flange 9 and a cooperating clamping ring 10 held to the flange 9 by a plurality of threaded bolts 11 which have their heads countersunk in the ring 10 and are tapped into the flange 9. This clamping ring is of similar contour to the flange 9 and is for the purpose of clamping to said flange 9 the edge portion of a flexible diaphragm 12 of rubber or similar material. The diaphragm 12 is formed approximately in the general shape of a shoe upper projecting into the dome 8, as is illustrated in Figs. 1 and 2. A similar diaphragm 13 is secured over the recess 3 in the bed plate by means of a clamping ring 14 and screws 15 tapped into the rim portion 16 forming the recess 3, as illustrated in Fig. 2, and in a similar manner to that just described in connection with the clamping ring 10 on the flange 9 of the dome. The lower diaphragm 13 has a slightly raised center in the outline of the sole, and is provided with a transverse rib 16 in proper position to fit substantially with the arch or shank of a lasted shoe when the same is positioned in the apparatus and rested upon the lower diaphragm 13, such a last 17 and shoe 18 being illustrated in position in Fig. 2. Ports 19 and 20 are provided in the dome 8 and recess 3 respectively to supply pressure applying means, such as compressed air, on the outer surface of the diaphragms 12 and 13, in order to collapse them about the shoe materials assembled on the last. These diaphragms being flexible will automatically fit the contour of the shoe contained therein, and the continued application of pressure through the ports 19 and 20 will stretch the diaphragms tightly around the entire contour of the shoe, thus compressing the shoe materials firmly, evenly, and simultaneously. Such pressure may be maintained for any desired length of time until the upper materials are suitably compacted into permanent form and smoothed upon the last. It will be understood that the rubber shoe materials are first assembled upon a last 17 in the usual manner by hand, the insole being applied to the bottom, then the lining being fitted over the last and insole, and the counter-edge, piping, and toe pieces, if any, fitted thereover, and finally the rubber upper and rubber outer sole being firmly fitted without the necessity of the hand rolling operations above mentioned. When thus assembled on the last, the dome 8 is raised, the shoe is rested upon the lower diaphragm 13, the transverse rib 16 aiding the operator in positioning the same. The dome 8 is then lowered, and pressure applied, as will now be described.

Formed as a part of the legs 4 and 5 and mounted on the bed plate 2 is an upstanding frame 21. It will be understood that an upstanding frame portion 21 is arranged on each side of the member 7, the pivot 6 being journaled in each one of said frames. The upstanding frames 21 also carry at 22 a shaft on which a cylinder 23 is pivotally mounted, having its piston 24 and piston rod 25 pivoted to the abutting ends of members 26 and 27 constituting a toggle joint. The upper end of the upper member 26 is pivoted at 28 to an overhanging portion of the frame 21 and the lower end of the toggle member 27 is pivoted at 29 to a portion of the upper part 7 of the molding apparatus carrying the dome 8. Actuation of the piston 24 will raise and lower the member 7 and dome 8 by breaking and setting the toggle comprising the members 26 and 27, as will be readily understood. When the piston 24 is moved outwardly, breaking the toggle members and raising the dome 8, I provide an arm 30 pivoted at 31 to the bed 2 and having a seat 32, which arm may be swung under the projecting lug 33 on the member 7, when the latter is lifted and hold the member 7 in raised position. The dome is thus lifted above the recess 3 and held in this lifted position, while the operator removes a lasted shoe and repositions another for the pressure applying process. Preferably I arrange the arm 30 to be actuated automatically, and pivot the lower portion of said arm 30 at 34 to a link 35, said link being in turn actuated by a bell crank lever 36 pivotally mounted at 37, in a depending flange 38 formed on the bed 2, and having the outer arm 39 of said bell crank forked to engage between a fixed collar 67 and a sliding collar 68 carried on a sliding rod 40 actuated by a foot treadle, (not shown). A spring 69 is seated on the rod and is compressed by a fixed collar 70 during the downward movement of the rod to throw the seat 32 under the lug 33 and hold up the dome when the latter is raised. During upward movement of the rod, the collar 67 strikes the fork of the bell crank lever and withdraws the seat from the lug to permit the dome to drop. Preferably I also arrange the rod 40 to actuate the valve admitting compressed air to the cylinder 23, and through the ports 19 and 20 to the mold comprising the dome 8 and recess 3, and the flexible diaphragms 12 and 13 respectively.

Secured to the rear of the frame 21 by a plurality of screws 41 is a valve plate 42, said plate also having upstanding brackets 43 and 44 carrying journal bearings for a cam shaft 45 mounted therein and carrying cam wheels 46 and 47 keyed or otherwise secured thereto. To the outer end of the cam shaft 45 is a toothed wheel 48 in position to be actuated by a spring pressed pawl 49, pivotally mounted on the arm 50, which arm is pivoted to the upper end of the rod 40 by a pin 51, as shown in Fig. 3. A spring 52 acts on the pawl 49 to hold the outer end of the same in engagement with the teeth of the wheel 48. The wheel 48 being keyed to the cam shaft 45, upon depression of the rod 40 the pawl 49 acts to turn the cam shaft 45 and consequently the cam wheels 46 and 47 through a partial rotation. The cam wheels 46 and 47 are arranged to control the admission of air from any suitable source of supply (not shown), first to the cylinder 23 to move the piston 24 toward the left, viewing Fig. 1, and actuate the toggle members 26 and 27 to move the upper member 7 and dome 8 downwardly into contact with the lower portion 2, upward movement of the rod 40 having first swung the arm 30 out of engagement with the lug 33. As soon as the member 7 is seated with the ring 10 of the dome portion 8 in contact with the lower ring 14 of the recess 3, air is then admitted through suitable pipes (not shown) to the ports 19 and 20 and the diaphragms 12 and 13 are actuated about the shoe materials as already described.

In order to control the admission of air, from a suitable supply under pressure, I provide valves which may be actuated by the attendant or operator to first release the air in the cylinder 23, permitting the member 7 to drop and straighten the toggle members 26 and 27, and then admit air to the ports 19 and 20. Then after the shoe has been subjected to pressure for a desired length of time, I arrange the valves to first release the pressure from the dome 8 and recess 3, and then to actuate the piston 24 in an outward direction to break the toggle and raise the dome 8, so that the completed shoe may be readily removed. To effect the sequence of operations just mentioned, I provide two air valves 52 and 53 (see Figs. 3 and 4) carried on the plate 42. In these air valves are plungers 54 and 55 respectively, each plunger having a by-pass, as indicated at 56 in the plunger 54 in its upper portion, and carrying on the extreme upper end, forked for the purpose, rolls 57 on the plunger 54 and 58 on the plunger 55. The cam wheels 47 and 46 already mentioned are in position on the shaft 45 to control the reciprocation of the plungers 54 and 55 respectively in their valves. Each cam 47 and 46 is in engagement with the rolls 57 and 58 respectively, the supply of air under pressure being admitted to the lower ports of the valves 52 and 53 at 59 and 60 respectively, and thus maintaining the said rolls in forcible engagement with their respective cam wheels.

The operation of the two valves just described is substantially identical, and I will now describe the mode of operation of the valve 52. Air from a convenient source of pressure supply being admitted to the valve 52 through the port 59, bears against the lower face 61 of the plunger 54 and upon a rotation of the shaft 45 through actuation of the rod 40, the plunger 54 will be moved upwardly as its roll 57 is allowed to engage one of the hollows or recesses in its controlling cam 47. The valve 52 is provided with ports 62 and 63 opening into a pass 65, which pass 65 has communication at 66 through a suitable pipe with the ports 19 and 20 in the dome and recess of the molding portion of the apparatus. As the plunger 54 is moved upwardly until its lower face 61 uncovers the port 62, air will then rush through the port 62, pass 65, pipe connected from 66 to the ports 19 and 20, and supply the desired pressure on either side of the flexible diaphragms to perform the desired operation on the shoe contained therebetween. Further rotation of the shaft 45 will force the plunger 54 downwardly by moving the roll 57 as it rides upon one of the raised arms of the cam wheel 47, and when the roll 57 is seated in the extreme outer portion of one of said arms, the plunger 54 will have closed the lower port 62 and the upper port 63 will be opened into the by-pass 56, and the air under pressure allowed to escape to the open air. A similar arrangement controls the actuation of the cylinder 23, the cam wheels being so arranged and the valves being so timed to effect the sequence of operations above described.

During the application of pressure behind the flexible diaphragms, it will be understood that the air contained within the mold between the diaphragms and the last will be forcibly excluded, passing out freely between the surfaces of the contacting portions of the dome and bed, thus permitting the diaphragms to fold evenly about the shoe materials upon the last. This exclusion of the air also enables a more firm cohesion between the various layers and parts comprising the rubber shoe, and furthermore, insures a better and closer fit of both sole and upper about the contour of the last, affording means whereby the entire pressure presented through the diaphragms will be exerted upon the shoe materials and press the same solidly against the last. This feature whereby the entire force exerted upon and through the flexible diaphragms from the source of pressure supply is utilized is most important, and I am enabled to so utilize this entire force by having provision whereby the air between the diaphragms and last may easily be forced out. I believe that the provision of apparatus whereby the air contained between the shoe materials and the last on which they are positioned may be expelled, during the process of manufacture and before the step of vulcanization, by applying pressure to the outer surfaces of the shoe materials, is a distinct novelty in this art, and I therefore desire to claim the same broadly.

It will thus be seen that I have provided an apparatus which is substantially automatic in its operations upon a shoe, and wherein a rubber shoe may be quickly and easily positioned, and the pressure applied, firmly compacting the various layers and materials comprising the rubber footwear, and then the apparatus quickly opened so that an operator can remove the completed shoe and reposition another. Furthermore, great speed of operation is possible and the most exact and uniform product is the result, even by unskilled labor, the rubber shoe being always subjected to the same degree of pressure, and such pressure being applied simultaneously throughout all parts of the surface of the shoe materials. One of the important advantages incident to the use of this apparatus is that the inspection of each rubber shoe, as was formerly required after the various hand rolling operations, is entirely unnecessary, no part of the surface of the rubber layers being "slighted," by my apparatus, nor is there any tendency to displace the various layers while the pressure is being applied, such applications of pressure being a direct impinging force substantially at right angles to the outer contour of the last on which the shoe materials are positioned. Furthermore, I find that, by means of my apparatus, the joint between the out sole and upper where the outsole is beveled at its edge portion, and has same turned up on and against the upper, is accurately, evenly and firmly joined, thus insuring absolute contact at this important point throughout the entire periphery of the edge of the sole, shank, and heel, and thus insuring that the rubber will be water tight after going through the vulcanizing process. I have also illustrated the yielding or flexible diaphragms 12 and 13 as of varying thickness, thus giving great elasticity and fitting capability to the diaphragms around such portions as the instep, toe cap, and shank, which is of considerable practical importance in insuring a satisfactory product, and I wish to claim this feature of a capability of varying elasticity, broadly.

Having described my invention, what I claim as new and desire to secure by Letters Patent is:

1. In an apparatus of the kind described, means to hold an unvulcanized lasted shoe, in combination with means to directly apply compacting pressure simultaneously to the entire exposed outer surface of both the upper and out sole of said shoe for compacting the shoe into a final product ready for vulcanization.

2. In an apparatus of the kind described, means to hold an unvulcanized lasted shoe, in combination with means to directly apply a substantially uniform pressure at right angles to the entire surface of the upper and out sole of the shoe for compacting the shoe into a final product ready for vulcanization.

3. An apparatus of the kind described, comprising a plurality of flexible diaphragms arranged to envelop an unvulcanized lasted shoe, in combination with means to apply pressure to the outer surface of said diaphragms to automatically conform the same to the contour of and thereby compact the shoe into a final product ready for vulcanization.

4. An apparatus of the kind described, comprising an upper and a lower diaphragm, in combination with means to apply pressure to either diaphragm independently of the other, said means being adapted to apply pressure to both diaphragms simultaneously to automatically conform said diaphragms to the contour of and thereby compact a shoe contained therebetween into a final product ready for vulcanization.

5. In an apparatus of the kind described, a dome having a flexible diaphragm therein formed approximately to fit the upper of an unvulcanized shoe, in combination with a lower yielding support for the insole of a shoe, and means to apply pressure to conform said diaphragm automatically to the contour of and thereby compact the upper of the shoe into a final product ready for vulcanization.

6. An apparatus of the kind described, comprising a lower member, an upper member pivotally secured thereto, yielding means carried by the lower member to support an unvulcanized shoe thereon, and coöperating means carried by the upper member to automatically apply pressure at right angles to the surface of a shoe positioned on the lower member when said upper member is moved in lowered position to compact the shoe into a final product ready for vulcanization.

7. An apparatus of the kind described, comprising a lower member, an upper member pivotally secured thereto, yielding means carried by the lower member to support a shoe thereon, coöperating means carried by the upper member to automatically contact about and compact an unvulcanized shoe positioned on the lower member into a final product ready for vulcanization when said upper member is moved in lowered position, and mechanism to move and maintain the upper member in lowered position.

8. In a device of the kind described, a mold to contain an unvulcanized lasted shoe, and means to supply pressure within said mold at right angles to all points on the outer surface of the shoe, and simultaneously permit the air contained between the shoe materials and the last to escape from said mold for compacting the shoe into a final product ready for vulcanization.

9. In a device of the kind described, a mold to contain an unvulcanized lasted shoe, a yielding diaphragm within said mold, and means to apply pressure on the outer side of said diaphragm to expand the same to contact with the outer surface of the shoe materials and compact the shoe into a final product ready for vulcanization, said mold permitting the escape of air originally contained therein between the diaphragm and the last.

10. In an apparatus of the kind described, means to hold an unvulcanized lasted rubber shoe, and means to directly apply pressure to the outer surface of the upper and sole of said shoe, and simultaneously expel air from the apparatus for compacting the shoe into a final product ready for vulcanization.

11. In an apparatus of the kind described, means to hold an unvulcanized lasted rubber shoe, flexible diaphragms arranged to envelop said shoe and shape the shoe into a final product ready for vulcanization, in combination with means to supply pressure from said diaphragms to the shoe and expel the air originally contained between said diaphragms.

12. In an apparatus of the kind described, means to hold an unvulcanized lasted rubber shoe, and means automatically coöperating with the contour of said shoe to supply pressure to the outer surfaces of the upper and sole of the shoe and expel the air between said surfaces of the upper and sole and said coöperating means, whereby to shape the shoe into a final product ready for vulcanization.

13. An apparatus of the character described, comprising means for supporting unvulcanized rubber shoe materials comprising layers of rubber and fabric lightly adhering to each other upon a last, and means for simultaneously applying compacting pressure to the layers from all points on the outer surfaces of all the outer layers of the shoe to compact the layers into a final product ready for vulcanization.

14. An apparatus of the character described, comprising a yielding inclosure adapted to envelop unvulcanized rubber shoe materials comprising layers of rubber and fabric lightly adhering to each other upon a last, in combination with a source of pressure supply whereby pressure is simultaneously applied to the layers from all points on the outer surfaces of the outer layers through the inclosure to compact the layers into a final product ready for vulcanization.

15. An apparatus of the character described, comprising coöperating diaphragms pre-shaped to approximately maintain the general shape of and envelop unvulcanized rubber shoe materials comprising layers of rubber and fabric lightly adhering to each other upon a last, and means for simultaneously applying pressure to the layers from all points on the outer surfaces of the outer layers through the diaphragms to compact the layers into a final product ready for vulcanization.

16. An apparatus of the character described, comprising a yielding inclosure for unvulcanized rubber shoe materials comprising layers of rubber and fabric lightly adhering to each other upon a last, and means for simultaneously applying pressure to the layers from all points on the outer surfaces of the outer layers through the inclosure to compact the layers against the last into a final product ready for vulcanization, said inclosure being formed of sections intentionally poorly connected so that the air within the inclosure is forced out through the poor connections when the pressure is applied.

In testimony whereof, I have signed my name to this specification, in the presence of two subscribing witnesses.

JOSEPH W. MOORE.

Witnesses:
JAMES R. HODDER,
EDWARD MAXWELL.